(12) United States Patent
Kroiss et al.

(10) Patent No.: US 10,994,751 B2
(45) Date of Patent: May 4, 2021

(54) RAILWAY TRACTION VEHICLE WITH ROOF JOINT ELEMENT

(71) Applicant: SIEMENS MOBILITY GMBH, Munich (DE)

(72) Inventors: Manuel Kroiss, Ebersbach (DE); Marcus Koerner, Grossinzemoos (DE); Hannes Peer, Munich (DE)

(73) Assignee: Siemens Mobility GmbH, Munich (DE)

(*) Notice: Subject to any disclaimer, the term of this patent is extended or adjusted under 35 U.S.C. 154(b) by 300 days.

(21) Appl. No.: 16/088,508

(22) PCT Filed: Feb. 2, 2017

(86) PCT No.: PCT/EP2017/052292
§ 371 (c)(1),
(2) Date: Sep. 26, 2018

(87) PCT Pub. No.: WO2017/167475
PCT Pub. Date: Oct. 5, 2017

(65) Prior Publication Data
US 2019/0100221 A1    Apr. 4, 2019

(30) Foreign Application Priority Data

Mar. 30, 2016 (DE) .......................... 102016205215.2

(51) Int. Cl.
*B61D 17/02*     (2006.01)
*B61D 17/12*     (2006.01)
(Continued)

(52) U.S. Cl.
CPC .............. *B61D 17/02* (2013.01); *B61C 17/00* (2013.01); *B61D 17/12* (2013.01); *B61D 1/06* (2013.01); *B61D 17/041* (2013.01); *Y02T 30/00* (2013.01)

(58) Field of Classification Search
CPC .... B62D 35/00; B62D 35/001; B62D 35/007; B62D 35/02; B61D 17/00; B61D 17/02
See application file for complete search history.

(56) References Cited

U.S. PATENT DOCUMENTS 5,249,837 A * 10/1993 Luttrell ................ B62D 35/001
                                                        296/180.3

FOREIGN PATENT DOCUMENTS

| CN | 104527677 A | 4/2015 |
|----|-------------|--------|
| DE | 102014200175 A1 | 7/2015 |

(Continued)

*Primary Examiner* — Robert J McCarry, Jr.
(74) *Attorney, Agent, or Firm* — Laurence Greenberg; Werner Stemer; Ralph Locher

(57) ABSTRACT

A railway traction vehicle, in particular a locomotive, is provided for pulling at least one coupleable railway car, which may be a two-level car, having a car body with a car roof which defines a car height. The locomotive includes a vehicle body with a vehicle roof which defines a vehicle height. If the vehicle height is lower than the car height, a roof transition element is disposed on a rear-side end region of the vehicle body. Since the cross-sectional profile of the roof transition element expands from the front edge, which follows a contour line of the vehicle roof, to the rear edge, which follows a contour line of the car roof, the flow resistance in the transition region from the locomotive to the subsequent two-level car is reduced in a simple way, so that traction energy losses and vehicle noise can be reduced.

4 Claims, 4 Drawing Sheets

(51) Int. Cl.
*B61C 17/00* (2006.01)
*B61D 1/06* (2006.01)
*B61D 17/04* (2006.01)

(56) References Cited

FOREIGN PATENT DOCUMENTS

| | | | |
|---|---|---|---|
| EP | 0616935 | A1 | 9/1994 |
| EP | 1566322 | A1 | 8/2005 |
| JP | H11321640 | A | 11/1999 |

\* cited by examiner

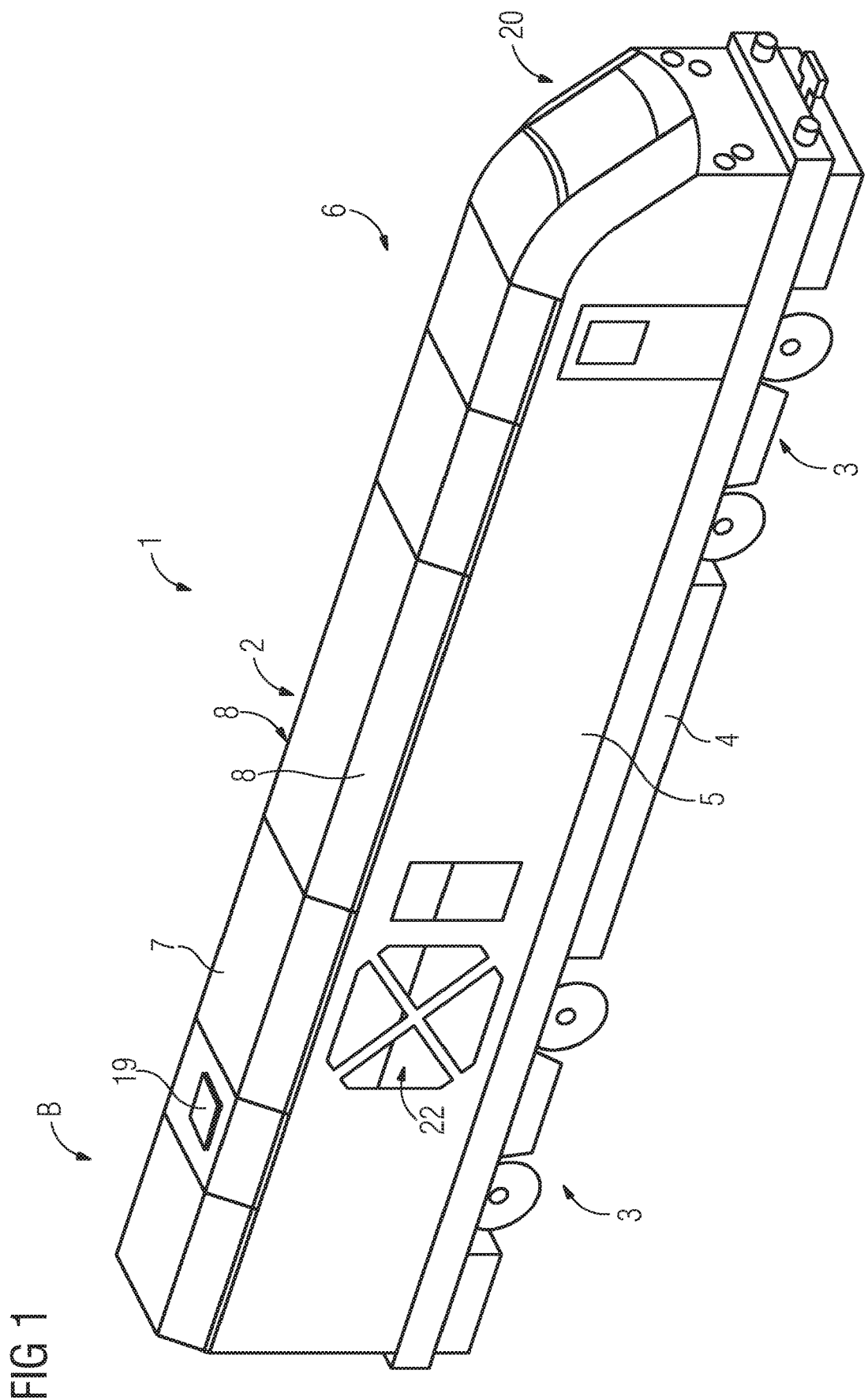

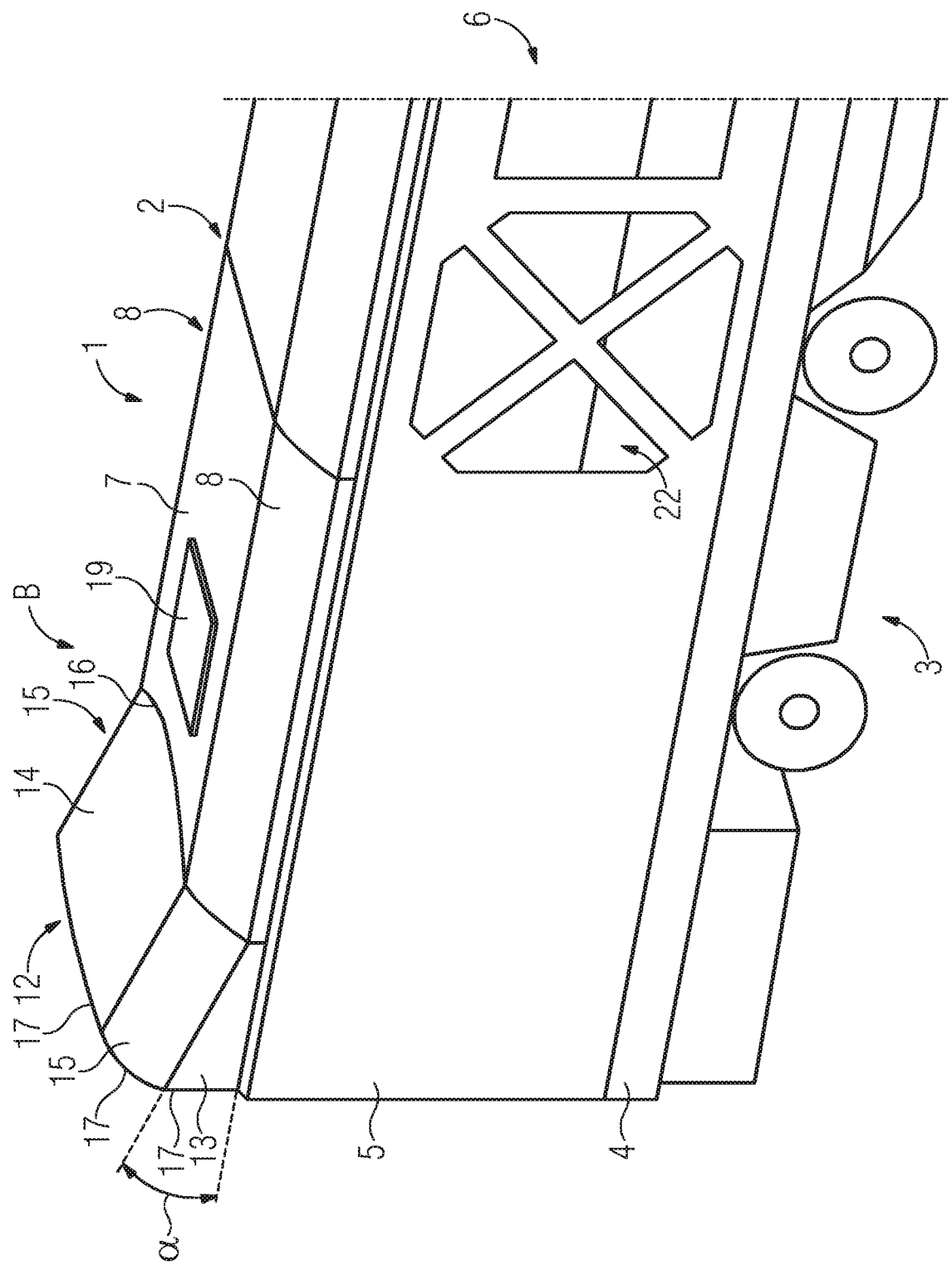

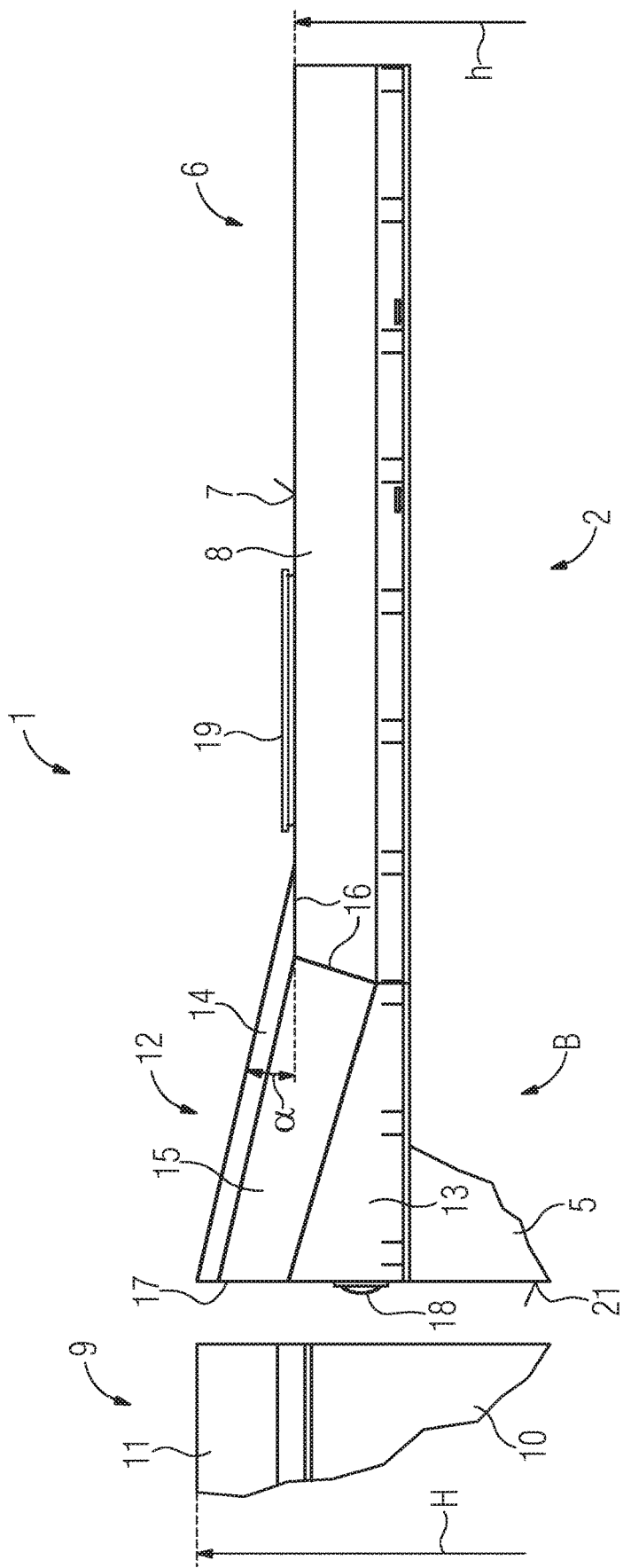

RAILWAY TRACTION VEHICLE WITH ROOF JOINT ELEMENT

BACKGROUND OF THE INVENTION

Field of the Invention:

The invention relates to a railway traction vehicle, in particular a locomotive, for pulling at least one coupleable railway car having a car body with a car roof defining a car height, the traction vehicle or locomotive including a vehicle body with a vehicle roof defining a vehicle height being lower than the car height.

Railway traction vehicles are electrically or diesel-electrically driven rail vehicles to which a train set, to be pulled, of railway cars, for example passenger or freight cars, is coupleable. While traction units are especially coordinated with the cross-sectional profile of the entire multiple unit set, with the versatile locomotives which can be used, a wide variety of combinations in respect of the train set to be pulled can occur. Depending on whether the coupled train set consists, for example, of single-level or two-level passenger cars, it is possible for scarcely any height difference or else more considerable height differences to occur between a vehicle height of the locomotive and a car height of the passenger cars. For a vehicle height of a locomotive of, for example, 4.2 m and a car height of a two-level car of, for example, 4.6 m, the height difference can be 0.4 m. Particularly at high traveling speeds, a large height difference by which a car height exceeds the vehicle height would have a disadvantageous effect on the aerodynamics and design of the traction vehicle and car combination.

In order to circumvent these disadvantages, the configuration known from multiple unit sets suggests adapting the cross-sectional profile of the vehicle body of a locomotive to the cross-sectional profile of the car body of the train set to be pulled during the designated operation of the locomotive. The provision of traction vehicles with different cross-sectional profiles of the vehicle bodies is highly complicated for the operator of a vehicle fleet.

Embodiments of this type are known, for example, from the documents EP 1 566 322 A1, EP 0 616 935 A1 and JP 11 321 640 A.

SUMMARY OF THE INVENTION

The invention is based on the object of providing a railway traction vehicle of the type mentioned at the beginning, which, with relatively little outlay, counters the disadvantages described.

The object is achieved according to the invention by a railway traction vehicle of the type of in question with 1 a roof transition element disposed on a rear-side end region of the vehicle body, the cross-sectional profile of which roof transition element expands from its front edge, which follows a contour line of the vehicle roof, as far as its rear edge, which follows a contour line of the car roof, the roof transition element being selectable from a set of a plurality of roof transition elements assigned to different railway cars, and the roof transition element being removably fastened to the vehicle roof. A railway traction vehicle, in particular a locomotive, for pulling at least one coupleable railway car having a car body accordingly comprises a vehicle body with a vehicle roof defining a vehicle height. If the vehicle height is lower than the car height defined by a car roof of the car body, a roof transition element is arranged according to the invention on a rear-side end region of the vehicle body. A cross-sectional profile of the roof transition element expands from its front edge, which follows a contour line of the vehicle roof, as far as its rear edge, which follows a contour line of the car roof. The roof transition element is preferably of flat design and has a shape which permits a low-vortex flow guidance of the head wind from the traction vehicle to the car. While the traction vehicle is otherwise unchanged, the aerodynamic, advantageous roof transition element can be produced and fitted with little outlay and promotes an energy-efficient and low-noise traveling mode. The transition between traction vehicle and first coupled car can also be configured to be visually attractive by means of the roof transition element. The outer surfaces of the roof transition element can thus be provided with the same enameling as the rest of the vehicle body.

In an advantageous embodiment of the railway traction vehicle according to the invention, the profile expansion of the roof transition element is designed to be continuous. Continuous is understood here as meaning an expansion of the cross-sectional profile from the front edge of the roof transition element as far as its rear edge without a jump or step. In particular, the roof transition element here has a continuous, closed outer surface at which the head wind flowing past during operation causes scarcely any turbulence.

In a preferred refinement of the railway traction vehicle according to the invention, the profile expansion of the roof transition element is designed to be smooth. Smooth is understood here as meaning an expansion of the cross-sectional profile from the front edge of the roof transition element as far as its rear edge without a kink or edge. The transition from the vehicle roof to the roof transition element at its front edge and/or the end of the roof transition element at its rear edge at most forms a slight kink in the profile expansion. Overall, however, a very substantially laminar flow of the head wind is achieved.

In an advantageous refinement of the railway traction vehicle according to the invention, the roof transition element is selectable from a set of a plurality of roof transition elements assigned to different railway cars. The roof transition element set consists of a plurality of roof transition elements, from which each is adapted to a different car roof having in each case a predetermined car height and contour line. This makes it possible to start from a traction vehicle platform, the traction vehicles of which differ as to whether a roof transition element is to be fastened to the vehicle roof at all and, if required, which of the roof transition elements is to be fastened thereto.

In a preferred embodiment of the railway traction vehicle according to the invention, the roof transition element is fastened removably to the vehicle roof. A destruction-free interchangeability of the roof transition element can be made possible, for example by a fastening by means of screw connections. If the traction vehicle is intended to be coupled in front of another train set of lower or greater car height, the roof transition element can be removed or replaced by a roof transition element, assigned to the other railway car, from the set of roof transition elements.

In a further advantageous embodiment of the railway traction vehicle according to the invention, accessory parts and connections are arranged outside that end region of the vehicle body which is covered by the roof transition element. Since train couplings, ladders, coupling sockets for electrical supply and communication lines, rear lights, antennae, compressed air connections, ventilation grates and the like are not arranged in the rear-side end region of the vehicle body that can be covered by the roof transition element, the traction vehicle according to the invention can be operated with and without a roof transition element.

BRIEF DESCRIPTION OF THE SEVERAL VIEWS OF THE DRAWING

Further properties and advantages of the invention emerge from the description below of a specific exemplary embodiment with reference to the drawings, in which FIG. 1 schematically illustrates a perspective view of a railway traction vehicle according to the invention without a roof transition element, FIG. 2 schematically illustrates a rear-side end region of the railway traction vehicle from FIG. 1 with a roof transition element fitted, and FIGS. 2A and 2B schematically illustrate additional roof transition elements, and FIG. 3 schematically illustrates a side view of the transition in the roof region from the railway traction vehicle from FIG. 2 to a railway carriage pulled by the latter.

DESCRIPTION OF THE INVENTION

Figure 2A:
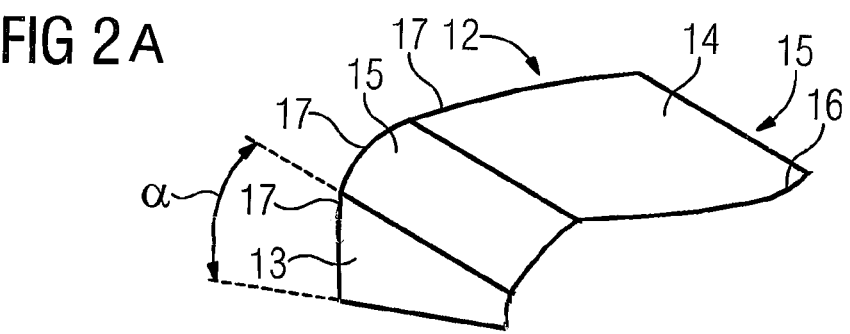
Figure 2B:
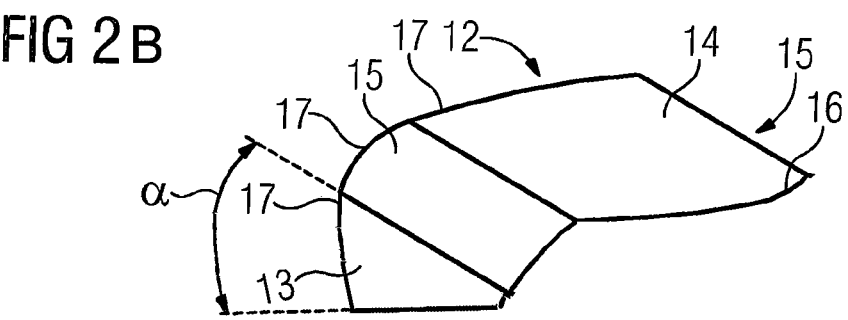

According to FIG. 1 to FIG. 3, a railway traction vehicle designed as a diesel-electric locomotive 1 has a vehicle body 2 which is mounted resiliently on two bogies 3 which are movable along a track. The vehicle body 2 comprises an under frame 4, two side walls 5 rising up therefrom and also a vehicle roof 6 defining a vehicle height h above a rail upper edge. A driver's cab 20 is located at the front-side end of the vehicle body 2, while the rear-side end of the vehicle body 2 is closed by a rear wall 21. Located in the vehicle body 2 behind the driver's cab 20 is an engine compartment 22 with components which are known per se, such as diesel engine, diesel tank, exhaust gas aftertreatment components, cooling system, generator, power converter and brake, compressed air and auxiliary operating equipment. The vehicle roof 6 has a substantially flat central part 7 and two side parts 8 which adjoin the central part 7, project obliquely downward and butt against the side walls 5.

The locomotive 1 is provided according to FIG. 3 for pulling a train set consisting of railway cars in the form of two-level cars 9. Each two-level car 9 has a car body 10 with a car roof 11 defining a car height H. Since, in the exemplary embodiment illustrated, the car height H significantly exceeds the vehicle height h, for example by 0.4 m, a roof transition element 12 is arranged according to the invention in a rear-side end region B of the vehicle body 2 in order to avoid unfavorable aerodynamic conditions.

The roof transition element 12 can be designed as a flat aluminum or steel sheet part which is bent in a U-shaped manner, sits with its open side facing downward on the vehicle roof 6 and is releasably fastened therein by means of screw connections. Accordingly, the roof transition element 12 has two triangular or trapezoidal side portions 13 which are oriented vertically and align with the side walls 5 of the vehicle body 2. Furthermore, the roof transition element 12 has a central portion 14 which covers the central part 7 of the vehicle roof 6 and is arranged inclined in relation to the horizontally oriented central part 7 by a setting angle a. Finally, the roof transition element 12 has two arcuate transition portions 15 which run above the side parts 8 of the vehicle roof 6 and connect the central portion 14 to the side portions 13. A front edge 16 of the roof transition element 12 follows a contour line of the cross-sectional profile of the vehicle body 2 while a rear edge 17 of the roof transition element 12 follows a contour line of the cross-sectional profile of the car body 10 of the two-level car 9 which is coupled to the locomotive 1. The inclined arrangement of the central portion 14 and of the side portions 13 results in a continuous, smooth profile expansion of the roof transition element 12 from its front edge 16 as far as its rear edge 17, which is aligned with the rear wall 21 of the vehicle body 2. The head wind occurring in the travel mode flows further from the vehicle body 2 of the locomotive 1 over the roof transition element 12 to the car body 10 of the two-level car 9 without forming large vortices. The roof transition element 12 according to the invention reduces the flow resistance in the transition region from locomotive 1 to the first two-level car 9 and therefore leads to lower traction energy losses and to reduced travel noises. In addition, the roof transition element 12 forms a more gentle visual transition and thereby also affords advantages for the vehicle design.

A further advantage of the locomotive 1 according to the invention resides in the simple convertibility if the operator wishes to use the locomotive 1 for pulling a different train set having a lower or greater car height H than previously. The operator can be provided here with a set of a plurality of roof transition elements 12 assigned to different railway cars. The roof transition elements 12 are adapted in respect of the setting angle a to the car heights H as is seen by comparing FIGS. 2, 2A and 2B, and in respect of the profile of the rear edge 17 to the contour line of the car roof 11. The roof transition elements 12 can also differ in terms of their length. So that the locomotive 1 can be operated easily both without and also with a roof transition element 12 of the provided set of roof transition elements, accessory parts and connections, such as, for example, train couplings, ladders, coupling sockets for electrical supply and communication lines, rear lights 18, antennae, compressed air connections, ventilation grates 19 and the like are arranged outside that end region B of the vehicle body 2 that is covered by the roof transition element 12. This makes it possible in the locomotive 1 according to the invention to start from a platform locomotive which, depending on use, differs only as to whether a roof transition element 12 is to be fastened to the vehicle roof 6 at all and, if required, which of the roof transition elements 12 is to be fastened thereto.

The invention claimed is:

1. A railway traction vehicle or locomotive for pulling at least one coupleable railway car having a car body with a car roof defining a car height, the railway traction vehicle or locomotive comprising:
   a vehicle body having a rear-side end region and having a vehicle roof defining a vehicle height, said vehicle height being lower than the car height;
   a set of a plurality of roof transition elements assigned to different railway cars having different car heights;
   a roof transition element being selectable from said set of roof transition elements in dependence on the car height of the railway car being pulled, said roof transition element being disposed on said rear-side end region, said roof transition element having a front edge following a contour line of said vehicle roof, a rear edge following a contour line of the car roof, and a cross-sectional profile expanding from said front edge to said rear edge; and
   said roof transition element being removably fastened to said vehicle roof.

2. The railway traction vehicle or locomotive according to claim 1, wherein said cross-sectional profile of said roof transition element expands continuously along a straight line without a jump or step.

3. The railway traction vehicle or locomotive according to claim 1, wherein said cross-sectional profile of said roof transition element expands smoothly along a straight line without a kink or edge.

4. The railway traction vehicle or locomotive according to claim 1, which further comprises accessory parts and connections disposed outside said end region of said vehicle body being covered by said roof transition element.

* * * * *